United States Patent
Lee et al.

(10) Patent No.: US 12,296,519 B2
(45) Date of Patent: May 13, 2025

(54) MOLD FOR SEAT PAD WITH MESH FIXED

(71) Applicants: Hyundai Motor Company, Seoul (KR); Kia Corporation, Seoul (KR); Hyundai Transys Inc., Chungcheongnam-do (KR)

(72) Inventors: Sang-Hark Lee, Incheon (KR); Sang-Do Park, Gyeonggi-do (KR); Deok-Soo Lim, Gyeonggi-do (KR); Chan-Ho Jung, Gyeonggi-do (KR); Sang-Soo Lee, Gyeonggi-do (KR); Beom-Sun Kim, Gyeonggi-do (KR); Sang-In Woo, Gyeonggi-do (KR); Hyun-Seok Song, Jeollanam-do (KR)

(73) Assignees: Hyundai Motor Company, Seoul (KR); Kia Corporation, Seoul (KR); Hyundai Transys Inc., Chungcheongnam-do (KR)

( * ) Notice: Subject to any disclaimer, the term of this patent is extended or adjusted under 35 U.S.C. 154(b) by 0 days.

(21) Appl. No.: 18/736,021

(22) Filed: Jun. 6, 2024

(65) Prior Publication Data

US 2024/0316847 A1    Sep. 26, 2024

Related U.S. Application Data

(62) Division of application No. 17/979,304, filed on Nov. 2, 2022, now Pat. No. 12,036,709.

(30) Foreign Application Priority Data

Dec. 21, 2021   (KR) .................... 10-2021-0183901

(51) Int. Cl.
| | |
|---|---|
| B29C 33/14 | (2006.01) |
| B29C 45/14 | (2006.01) |
| B29C 45/26 | (2006.01) |
| B29C 45/37 | (2006.01) |
| B29L 31/00 | (2006.01) |
| B29L 31/58 | (2006.01) |

(52) U.S. Cl.
CPC .......... *B29C 45/2675* (2013.01); *B29C 33/14* (2013.01); *B29C 45/14* (2013.01); *B29C 45/2602* (2013.01); *B29C 45/37* (2013.01); *B29L 2031/58* (2013.01); *B29L 2031/771* (2013.01)

(58) Field of Classification Search
None
See application file for complete search history.

(56) References Cited

U.S. PATENT DOCUMENTS 4,927,575 A    5/1990   Brock et al.

FOREIGN PATENT DOCUMENTS

| CN | 114475379 A | 5/2022 |
|---|---|---|
| KR | 2018-0030346 A | 3/2018 |

*Primary Examiner* — Armand Melendez
(74) *Attorney, Agent, or Firm* — Fox Rothschild LLP

(57) ABSTRACT

Provided is a mold for a seat pad with a mesh fixed, which can easily fix a mesh to be inserted in a molding process. The mold includes a plurality of mold members overlapping each other and molding a seat pad by foaming a resin injected into a space formed between the mold members, the mold members are formed with a mesh accommodating groove accommodating a mesh, and the mesh is fitted into and fixed to the mesh-accommodating groove.

7 Claims, 7 Drawing Sheets

MOLD FOR SEAT PAD WITH MESH FIXED

CROSS-REFERENCE TO RELATED APPLICATION

This application is a divisional of U.S. Ser. No. 17/979,304, filed on Nov. 2, 2022, which claims priority under 35 U.S.C. § 119 (a) the benefit of Korean Patent Application No. 10-2021-0183901, filed on Dec. 21, 2021, which is incorporated herein by reference in its entirety.

TECHNICAL FIELD

Embodiments of the present disclosure relate to a mold for a seat pad for manufacturing a seat pad that provides a cushion to a seat for a vehicle, and more specifically, to a mold for a seat pad with a mesh fixed so that the mesh to be inserted can easily be fixed in a molding process.

BACKGROUND

A seat for a vehicle is manufactured by surrounding a seat pad made of a cushion material with a seat cover made of a fabric or leather material and mounting it on a frame so that a passenger can feel comfortable.

In addition, a tape, non-woven fabric, etc. is attached to the seat pad to facilitate assembly, or these are integrally molded. In addition, a ventilation unit or a heating pad is attached to the seat pad to give a function to the seat.

The seat pad is molded by foaming a resin such as a urethane resin, and at this time, a mesh is also molded to give air permeability to the seat pad.

To mold the mesh together with the seat pad, the mesh should be fixed to a mold for molding the seat pad.

For example, by performing the molding in a state where the mesh is fixed to the mold using a Velcro tape, an adhesive tape, etc., the seat pad with the mesh inserted therein is molded.

However, there occurs a phenomenon in which the resin is impregnated in the tape for fixing the mesh and the resin permeates between the mesh and the mold, which is a factor of a defect.

In addition, when the resin is injected, the mesh is moved by the flow of the resin, thereby also causing the defect.

SUMMARY

Embodiments of the present disclosure are related to a mold for a seat pad with a mesh fixed so that the mesh can be easily fixed when a seat pad of a vehicle is molded.

In one aspect, a mold for a seat pad with a mesh is provided. In an aspect, the mold suitably comprises: a plurality of overlapping mold members, wherein at least one of the mold members comprises a mesh-accommodating groove for producing a mesh in a seat pad, and wherein the mesh is fitted into and fixed to the mesh-accommodating groove during a seat pad production process.

In a further aspect, a mold for a seat pad with a mesh is provide, where the mold comprises a plurality of mold members overlapping each other and a seat pad can be molded by one or more steps that comprise adding a polymer or resin material to the mold, e.g. by injecting or otherwise adding resin (such as a resin foam) into a space formed between the mold members. Preferably, at least one of the mold members is formed with a mesh-accommodating groove for accommodating and/or forming a mesh, and the mesh is fitted into and fixed to the mesh-accommodating groove.

In the above aspects, preferably the mold further comprises a locking member configured to restrain the mesh in the mesh-accommodating groove and to thereby prevent or inhibit the mesh from being separated from the mesh-accommodating groove.

In one embodiment, locking member suitably is a locking part in which open upper ends of a cross section of the mesh-accommodating groove extend by a predetermined length to face each other to restrain the mesh fitted into the mesh-accommodating groove.

In an embodiment the locking member suitably is a protrusion formed to protrude from an upper end of the mesh-accommodating groove in a round shape to cover the mesh fitted into the mesh-accommodating groove.

In an embodiment, the locking member suitably is an auxiliary jig fitted into the mesh-accommodating groove, and having the mesh fitted therein.

In an embodiment, the locking members are suitably formed in one or more mesh-accommodating grooves at intervals including where the mesh-accommodating grooves arranged in a single direction, or in varying directions.

Suitably, a cross section of the mesh-accommodating groove is formed in a shape corresponding to a cross section of the mesh and therefore, the circumference of the mesh is in close contact with an inner surface of the mesh-accommodating groove.

In certain embodiments, both side surfaces of each of a cross section of the mesh and a cross section of the mesh-accommodating groove are formed to be parallel to each other, and the mesh is fitted into and fixed to an inner surface of the mesh-accommodating groove in a direction perpendicular to a direction in which the mesh is inserted into the mesh-accommodating groove.

In certain embodiments each of the cross sections of the mesh and the mesh-accommodating groove is formed in a rectangular shape.

In certain embodiments, the mesh is inserted as an interference fit into the mesh-accommodating groove.

In certain embodiment, the mesh-accommodating groove is formed to have a thinner depth toward the end in a portion adjacent to the end of the mesh-accommodating groove.

According to the mold for the seat pad with the mesh fixed according to embodiments of the present disclosure having the above configuration, it can be possible to fix the mesh to the mold even without the additional member by fitting and fixing the mesh into the mold.

Since the mesh is fixed by the mold, the mesh does not deviate from the initial position even if the resin flows while the resin is injected to mold the seat pad, thereby making the quality of the seat pad uniform.

In addition, the phenomenon that the resin is permeated between the mesh and the mold can be avoided, by preventing resin from impregnating the member for fixing the mesh.

In a further aspect, methods for producing a seat pad with mesh, are provided and may suitably comprise: a) providing a mold that comprises a plurality of mold members overlapping each other; and b) adding a resin to the mold members; wherein at least one of the mold members comprises a mesh-accommodating groove for producing a mesh in a pad. In certain aspects, resin is added (e.g. injected) into spaces between the mold members. In certain aspects, the mold further comprises a locking member as discussed above that is configured to restrain the mesh in the mesh-accommodating groove where the locking member can prevent the mesh from being separated from the mesh-accommodating groove.

Other aspects are disclosed infra.

DESCRIPTION OF SPECIFIC EMBODIMENTS

Figure 1:
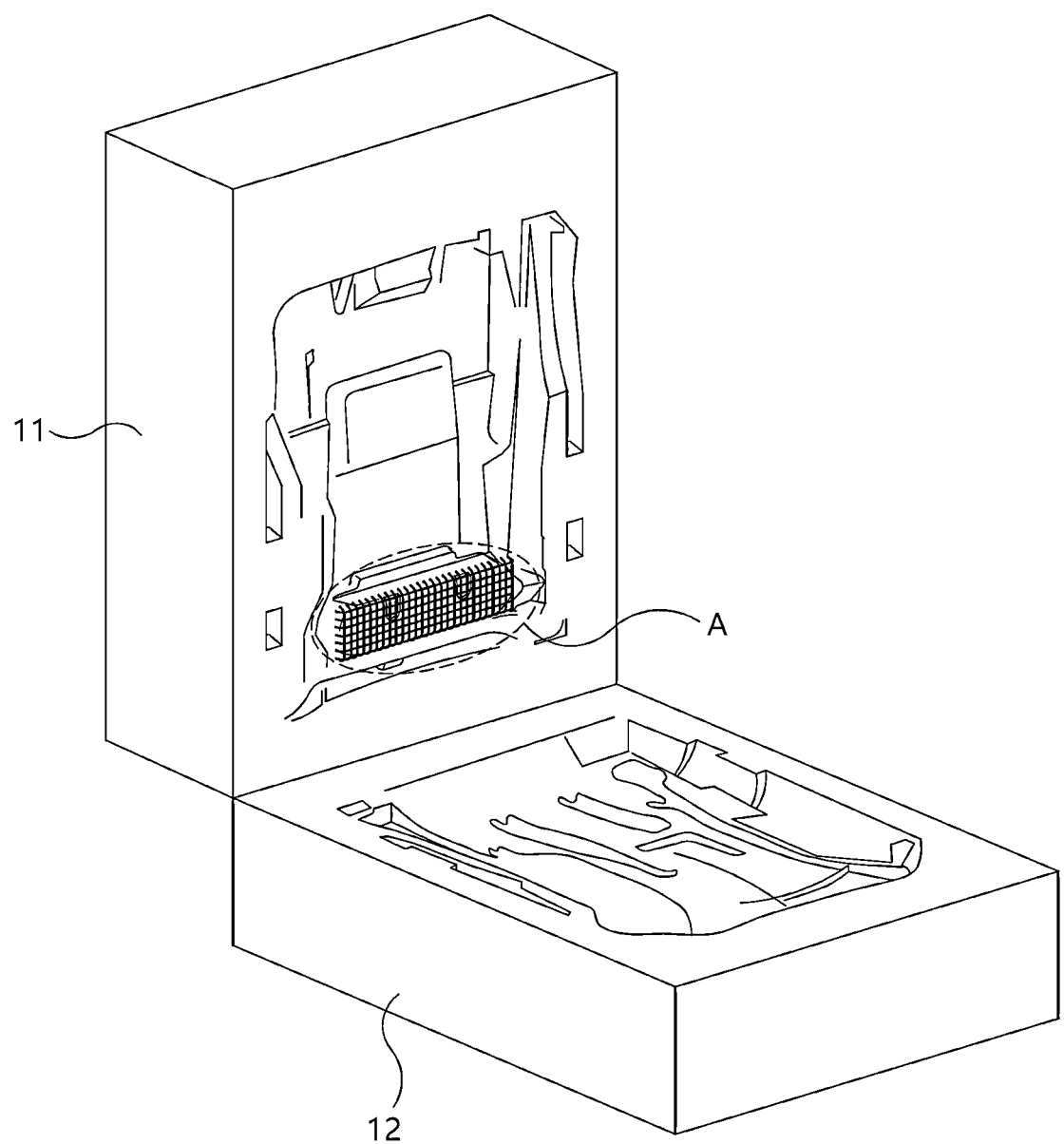
FIG. 1 is a perspective diagram of a mold for a seat pad with a mesh fixed according to the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation and can be implemented by hardware components or software components and combinations thereof.

Hereinafter, a mold for a seat pad with a mesh fixed according to embodiments of the present disclosure will be described in detail with reference to the accompanying drawings.

The mold for the seat pad with the mesh fixed according to embodiments of the present disclosure may include a plurality of mold members 11, 12 overlapping each other, and in the mold for the seat pad that molds a seat pad 20 by foaming the resin injected into a space formed between the mold members 11, 12, at least any one of the mold members 11, 12 is formed with a mesh-accommodating groove 13 accommodating a mesh 15, and the mesh 15 is fitted into and fixed to the mesh-accommodating groove 13.

The mold 10 may include the plurality of mold members 11, 12, and the space is formed between the mold members 11, 12 overlapping each other. A molten resin may be injected into the space formed between the mold members 11, 12, and the resin is foamed to manufacture a seat pad 20 that provides a cushion to a seat for a vehicle.

For example, the mold members 11, 12 may be classified into an upper mold 11 and a lower mold 12 so that the space in which the seat pad 20 is molded is formed therebetween while vertically overlapping with each other.

The upper mold 11 and the lower mold 12 may have the space in which the seat pad 20 is formed on overlapping surfaces, that is, a lower surface of the upper mold 11 and an upper surface of the lower mold 12. In a state where the upper mold 11 and the lower mold 12 are fastened to each other, a resin such as a urethane resin may be injected in a molten state into the space configured between the upper mold 11 and the lower mold 12 and is foamed and molded into the seat pad 20.

The mesh-accommodating groove 13 for fixing the mesh 15 to be inserted into the seat pad 20 may be formed in any one of the upper mold 11 and the lower mold 12. Alternatively, the mesh-accommodating groove 13 may also be formed in both the upper mold 11 and the lower mold 12. Hereinafter, an example in which the mesh-accommodating groove 13 is formed in the upper mold 11 will be described.

Figure 2:
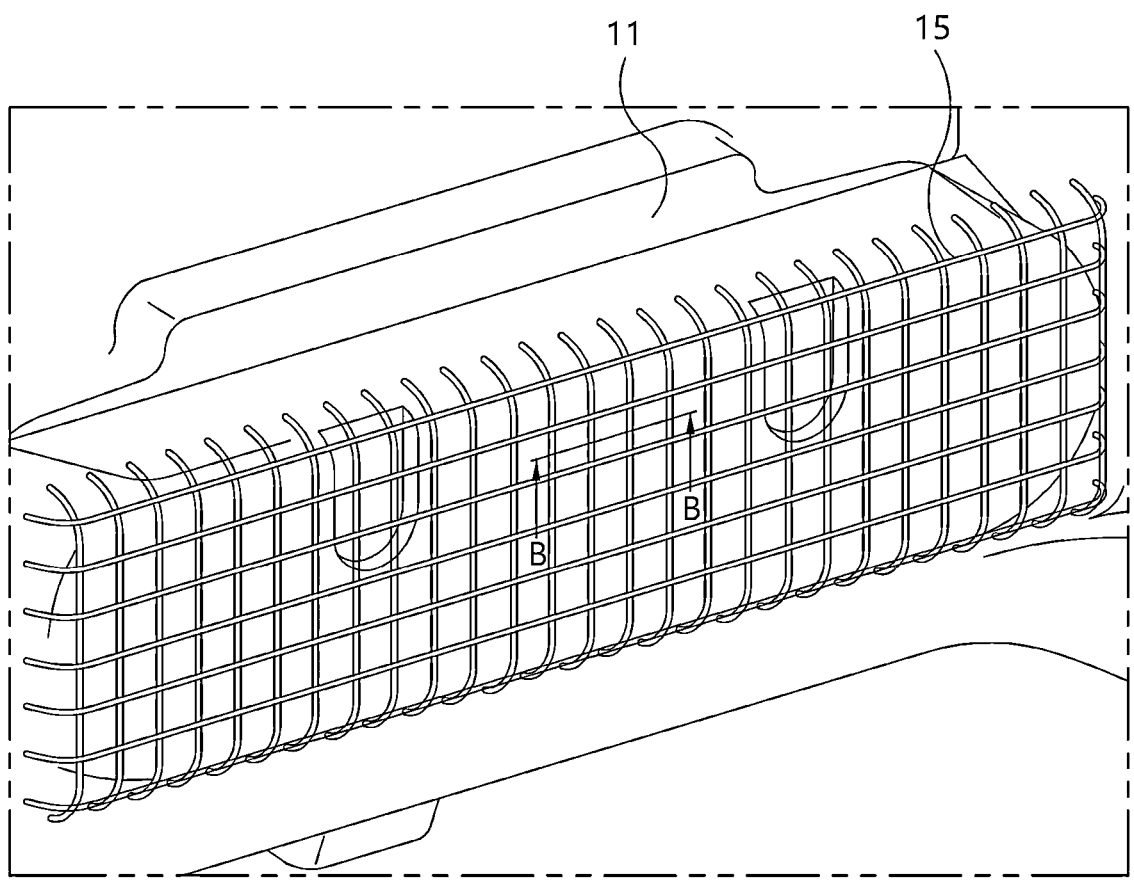
FIG. 2 is an enlarged diagram of a part A of FIG. 1.
Figure 3:
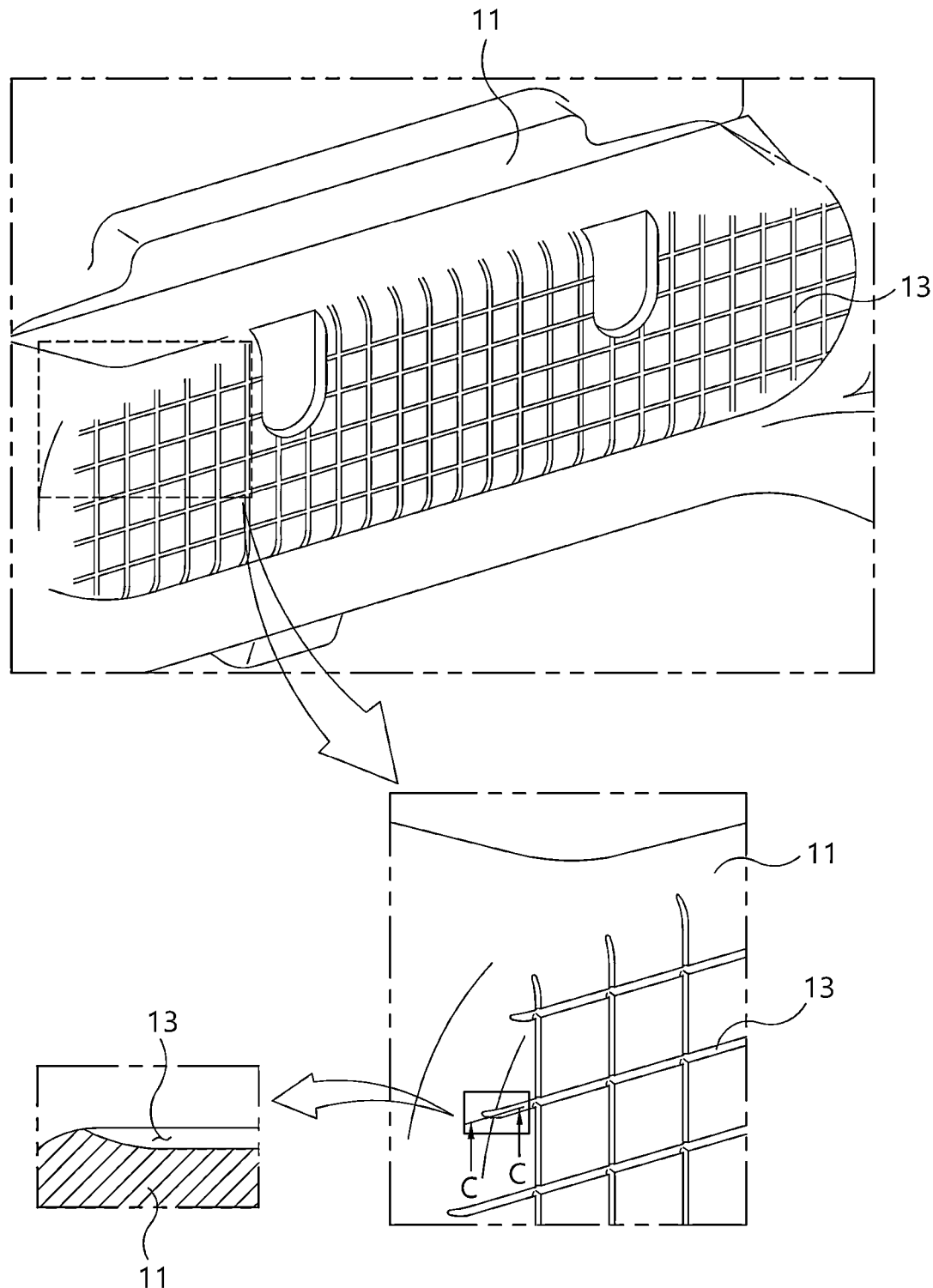
FIG. 3 is an enlarged perspective diagram of a main part showing a shape of a mesh-accommodating groove in which the mesh is seated in the mold for the seat pad with the mesh fixed according to the present disclosure.
Figure 4:
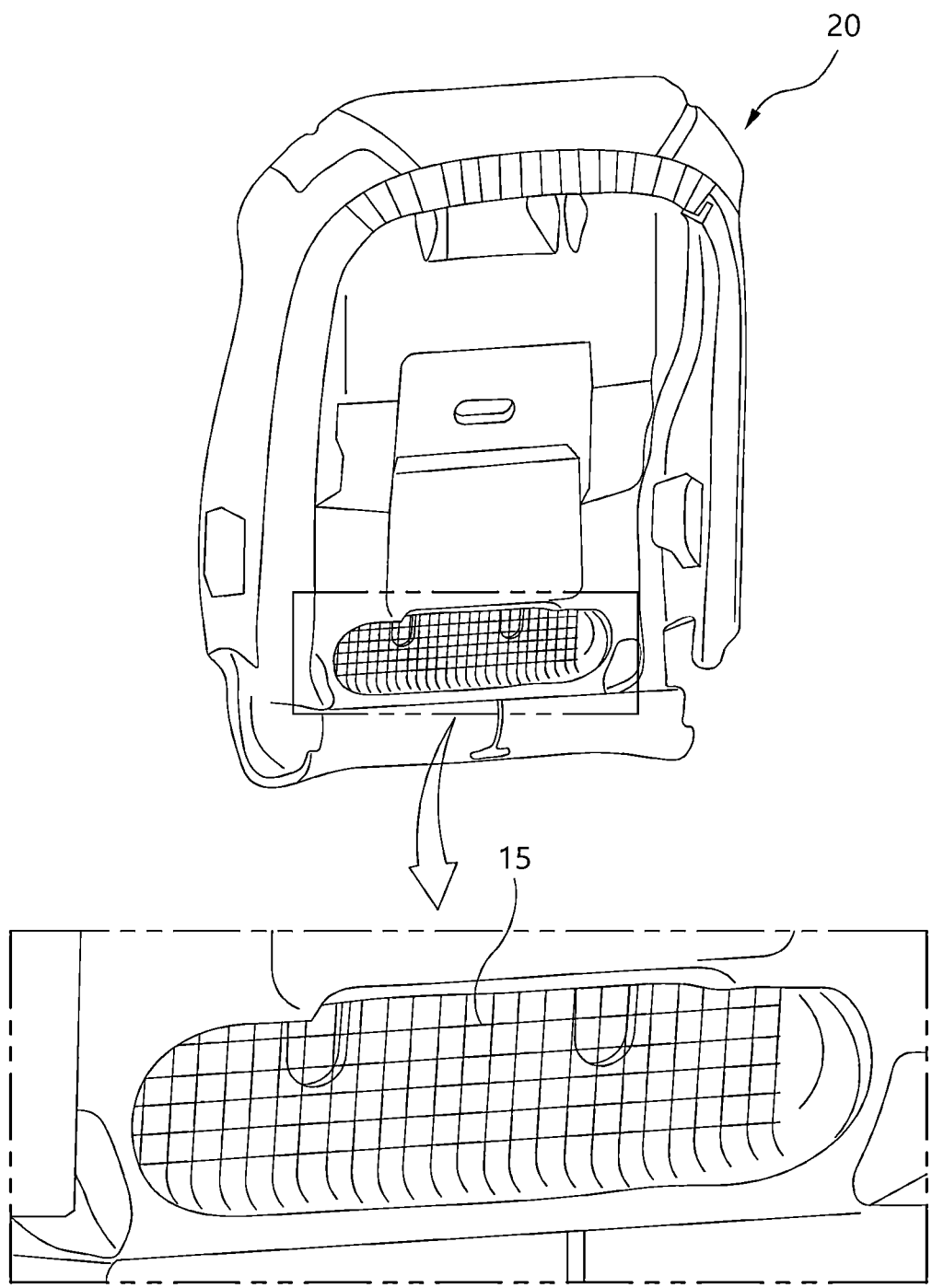
FIG. 4 is a perspective diagram of a seat pad molded using the mold for the seat pad with the mesh fixed according to the present disclosure.

As shown in FIG. 2, in a state where the mesh 15 is fixed to the upper mold 11 by accommodating the mesh-accommodating groove 13, that is, a state where the mesh 15 is fitted into the mesh-accommodating groove 13 formed in the upper mold 11, when the seat pad 20 is molded, as shown in FIG. 4, the mesh 15 may be inserted into the molded seat pad 20.

Since the mesh 15 has a grid structure, the mesh-accommodating groove 13 may be also formed in a grid structure. The mesh-accommodating groove 13 may be formed at a predetermined depth, and a part of the mesh 15 is accommodated in the mesh-accommodating groove 13, and therefore, the mesh 15 may be seated in the mesh-accommodating groove 13. For example, about half of a wire that constitutes the mesh 15 may be seated in the mesh-accommodating groove 13, and the rest may be exposed to the outside.

A cross section of the mesh-accommodating groove 13 may be formed in a shape corresponding to a cross section of the mesh 15 so that the circumference of the mesh 15 is in close contact with an inner surface of the mesh-accommodating groove 13. In other words, as the cross-sectional shape of the mesh-accommodating groove 13 is configured to match the cross-sectional shape of the mesh 15 and therefore, the cross-section of the mesh 15 is configured in various shapes, the mesh-accommodating groove 13 may be also configured in various forms. For example, if the cross section of the mesh 15 is configured in a rectangular shape, the cross section of the mesh-accommodating groove 13 may be also configured in the rectangular shape, and if the cross section of the mesh 15 is configured in a circular shape, the cross section of the mesh-accommodating groove 13 may be also configured in the circular shape.

The mesh-accommodating groove 13 may be configured to prevent the mesh 15 from being separated from the mesh-accommodating groove 13 when the mesh 15 is accommodated. The mesh 15 may not be separated from the mesh-accommodating groove 13, and the mesh 15 may be fitted into and fixed to the mesh-accommodating groove 13, and therefore, the mesh 15 may be fixed to the upper mold 11 even without an additional member such as a Velcro tape or an adhesive tape.

In particular, according to embodiments of the present disclosure, when the mesh 15 is inserted into the mesh-accommodating groove 13, a structure of preventing the mesh 15 from being separated from the mesh-accommodating groove 13 may be applied.

For example, a locking member holding the mesh 15 into the mesh-accommodating groove 13 to prevent the mesh 15 from being separated may be applied.

Figure 5:
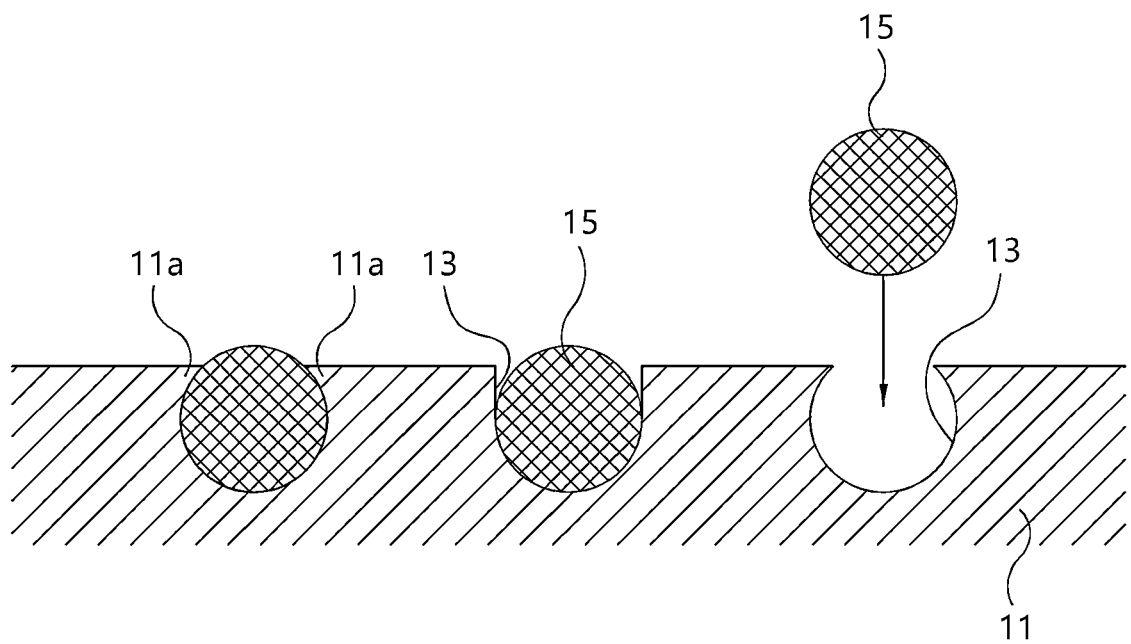
FIGS. 5 to 8 are cross-sectional diagrams each showing examples of fixing the mesh in the mold for the seat pad with the mesh fixed according to the present disclosure.

As an example of the locking member, FIG. 5 shows a configuration in which a locking part 11a is formed.

The locking member may protrude from the end of the mesh-accommodating groove 13 to become the locking part 11a. The locking part 11a may prevent the mesh 15 inserted into the mesh-accommodating groove 13 from being separated.

The locking part 11a may be formed so that the open upper ends of the cross section of the mesh-accommodating groove 13 extend by a predetermined length to face each other. The mesh-accommodating groove 13 may have the cross section formed in a U-shape to accommodate the wire constituting the mesh 15. At this time, the upper ends of the cross section of the mesh-accommodating groove 13 may extend to protrude toward the side facing each other, so that the locking part 11a is formed. As shown in FIG. 5, the locking part 11a may restrain a part of an upper portion of the wire constituting the mesh 15, thereby preventing the mesh 15 from being separated from the mesh-accommodating groove 13.

The locking part 11a may also be formed in the entire mesh-accommodating groove 13, but it is preferable that the locking part 11a is formed in only some of them. Like the mesh 15, the mesh-accommodating groove 13 may be also formed in a grid shape, and the locking parts 11a may be formed in some mesh-accommodating grooves 13 at intervals in the mesh-accommodating grooves 13 arranged in any one direction, and the locking parts 11a may not be formed in the other mesh-accommodating grooves 13. Referring to FIG. 5, the locking parts 11a may be formed in the first and third mesh-accommodating grooves 13, but the locking part 11a may not be formed in the second mesh-accommodating groove 13.

In addition, the locking part 11a may be formed only in some sections, not the entire section.

Since the locking part 11a is for preventing the movement of the mesh 15 inserted in the mesh-accommodating groove 13 during the molding time of the seat pad 20, it may be sufficient the locking parts 11a are formed only in some sections of the mesh-accommodating groove 13.

Figure 6:
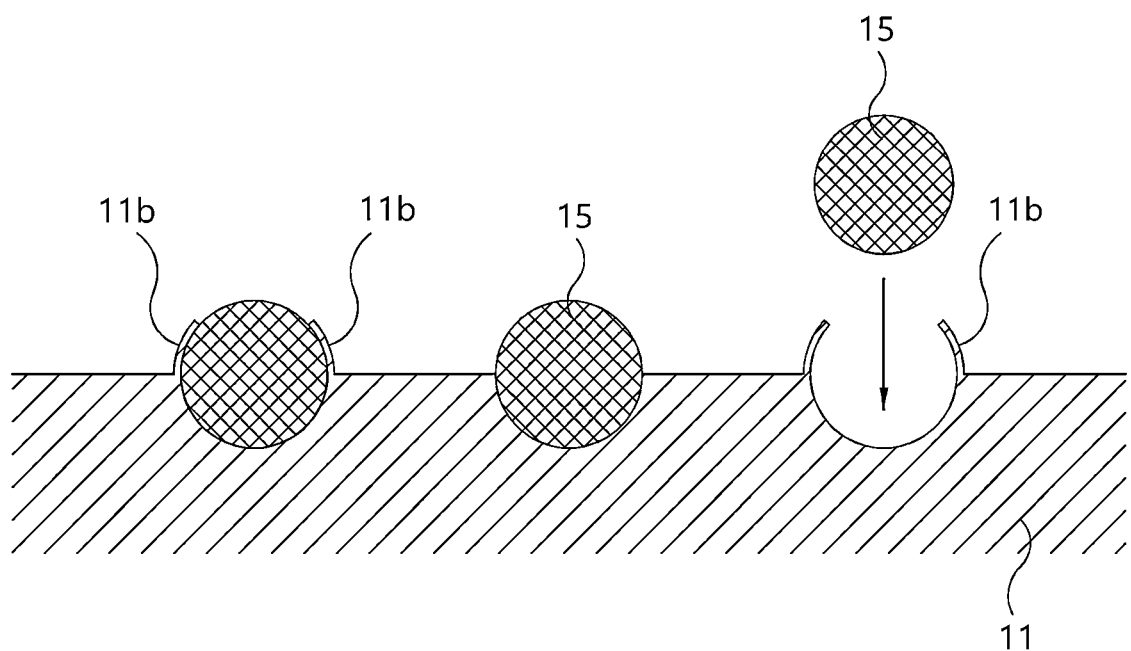

Meanwhile, the locking member may be a protrusion 11b shown in FIG. 6. The protrusion 11b may be protruded from the upper end of the mesh-accommodating groove 13 in a round shape. The protrusion 11b may be protruded in a round shape in the cross section of the mesh-accommodating groove 13 to cover a part of the upper portion of the mesh 15 when the mesh 15 is fitted into the mesh-accommodating groove 13. The protrusion 11b may be formed to be round in a shape of covering the mesh 15 inserted into the mesh-accommodating groove 13, thereby preventing the mesh 15 inserted into the mesh-accommodating groove 13 from being separated.

When the mesh 15 is inserted into the mesh-accommodating groove 13, the mesh 15 or the protrusion 11b may be elastically deformed, and therefore, the wire constituting the mesh 15 may be inserted even if a width of an upper end of the protrusion 11b is smaller than a diameter of the wire constituting the mesh 15.

The protrusion 11b may also be formed in some mesh receiving grooves 13. In other words, the protrusions 11b may be formed in some mesh-accommodating grooves 13 at intervals in the mesh-accommodating grooves 13 arranged in any one direction, and the protrusions 11b may not be formed in the other mesh-accommodating grooves 13. In addition, the protrusion 11b may also be formed only in some sections of the mesh-accommodating groove 13.

Figure 7:
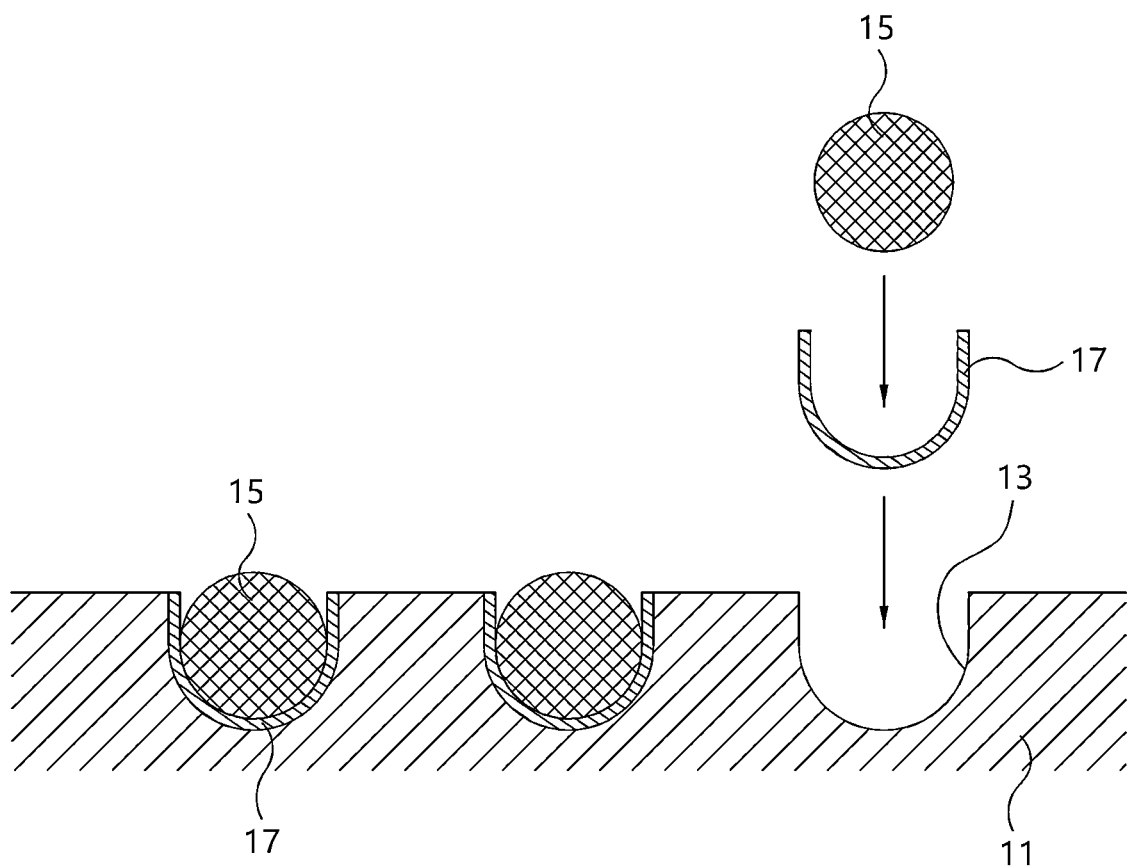

In FIG. 7, an auxiliary jig 17, which is a separate member, may be interposed to hold the circumference of the mesh 15, thereby preventing the mesh 15 from being separated. The auxiliary jig 17 may be fitted into the mesh-accommodating groove 13, and may have the mesh 15 fitted therein.

If the diameter of the wire constituting the mesh 15 is small, it may be difficult for the mesh-accommodating groove 13 to restrain the mesh 15 from being separated, so that the auxiliary jig 17 is interposed. The auxiliary jig 17 may have an inside surface holding the mesh 15 and an outside surface inserted into the mesh-accommodating groove 13, so that the mesh 15 formed of the wire having the small diameter is fixed to the mesh-accommodating groove 13.

To insert the auxiliary jig 17, the mesh-accommodating groove 13 may be formed to be parallel to both sides of the cross section thereof from a surface of the upper mold 11 up to a certain depth, and the remaining portion may be formed in a round shape.

As shown in FIG. 7, the auxiliary jig 17 is preferably applied to all of the mesh-accommodating grooves 13, but may also be applied only to some mesh-accommodating grooves 13 or some sections of the mesh-accommodating groove 13.

Figure 8:
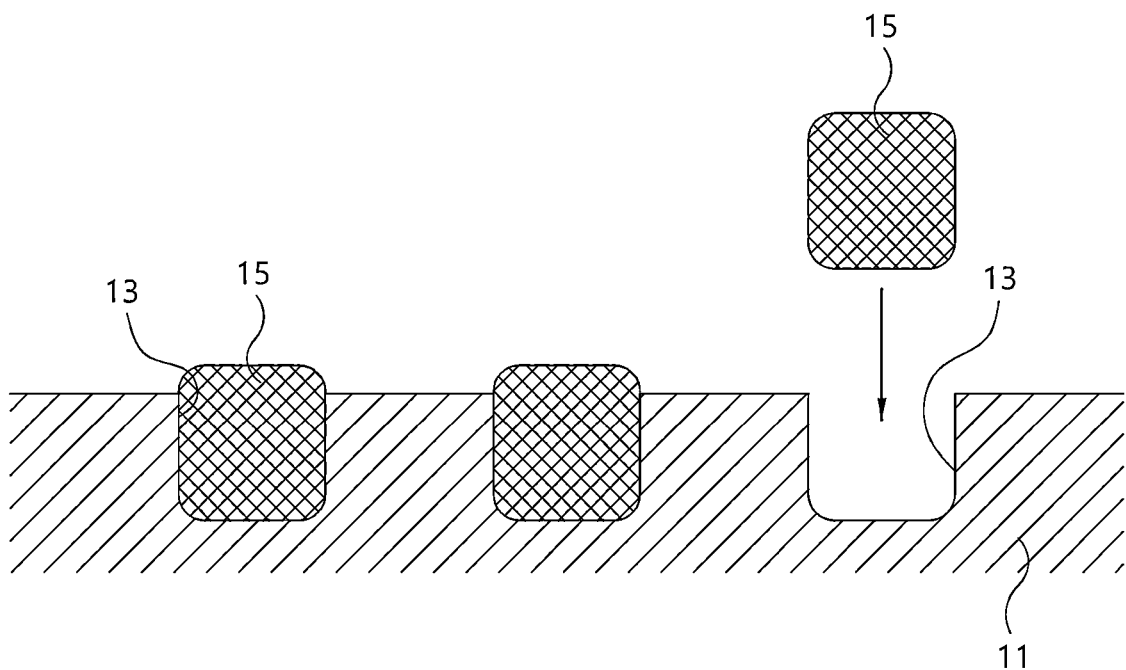

FIG. 8 shows an example in which a friction force between the mesh 15 and the mesh-accommodating groove 13 is increased, thereby preventing the mesh 15 from being separated from the mesh-accommodating groove 13.

Both side surfaces of each of the cross section of the mesh 15 and the cross section of the mesh-accommodating groove 13 may be formed to be parallel to each other, and the mesh 15 may be fitted into and fixed to the mesh-accommodating groove 13 in a direction perpendicular to a direction in which the mesh 15 is inserted into the mesh-accommodating groove 13.

For example, the cross section of the mesh 15 and the cross section of the mesh-accommodating groove 13 may be formed in a rectangular shape, respectively, and both side surfaces of the cross section of the mesh 15 may be fitted into the cross section of the mesh-accommodating groove 13, thereby preventing the mesh 15 from being separated. To this end, a tolerance between the cross section of the mesh 15 and the cross section of the mesh-accommodating groove 13 may be an interference fit.

According to the aforementioned structure, the mesh 15 inserted into the mesh-accommodating groove 13 may be accommodated in the mesh-accommodating groove 13, thereby preventing the mesh 15 from being separated from the mesh-accommodating groove 13. The mesh 15 may be just inserted and fit into the mesh-accommodating groove 13 without applying the additional member such as a Velcro tape or an adhesive tape, thereby facilitating the assembly process.

In addition, in the molding process, it is possible to prevent the molten resin from being impregnated into the Velcro tape or the adhesive tape, or from permeating between the tape and the upper mold 11 or the lower mold 12, and to prevent the mesh from being separated during molding, thereby preventing the failure of the produced seat pad 20.

What is claimed is:

1. A mold for a seat pad with a mesh comprising:
    a plurality of mold members overlapping each other,
    wherein at least one of the mold members comprises a plurality of mesh-accommodating grooves for producing a mesh in a seat pad, and
    wherein the mesh is fitted into and fixed to the plurality of mesh-accommodating grooves,
    further comprising a locking member that is configured to restrain the portion of the mesh fitted into a mesh-accommodating groove of the plurality of mesh-accommodating grooves and to prevent the mesh from being separated from the mesh-accommodating groove in which it is fitted,
    wherein a cross section of each of the plurality of mesh-accommodating grooves is formed in a shape corresponding to a cross section of the portion of the mesh fitted therein, and both side surfaces of the cross section of each of the plurality of mesh-accommodating grooves and the cross section of the portion of mesh fitted therein are formed to be parallel to each other, and
    wherein the locking member comprises a locking part in which open upper ends of a cross section of the mesh-accommodating groove extend by a predetermined length to face each other to restrain the mesh fitted into the mesh-accommodating groove.

2. The mold of claim 1, wherein the mesh-accommodating groove is formed to a round shape to be fitted the mesh.

3. The mold of claim 1, wherein one or more locking members are formed in one or more of the plurality of mesh-accommodating grooves.

4. The mold of claim 1, wherein the mesh is fixed to an inner surface of the plurality of mesh-accommodating grooves in a direction perpendicular to a direction in which the mesh is inserted into the mesh-accommodating groove.

5. The mold of claim 4, wherein each of the cross sections of the mesh and the plurality of mesh-accommodating grooves is formed in a rectangular shape.

6. The mold of claim 4, wherein the mesh is inserted as an interference fit into the plurality of mesh-accommodating grooves.

7. The mold of claim 1, wherein the mesh-accommodating groove is formed to have a thinner depth toward the end in a portion adjacent to the end of the mesh-accommodating groove.

* * * * *